UNITED STATES PATENT OFFICE.

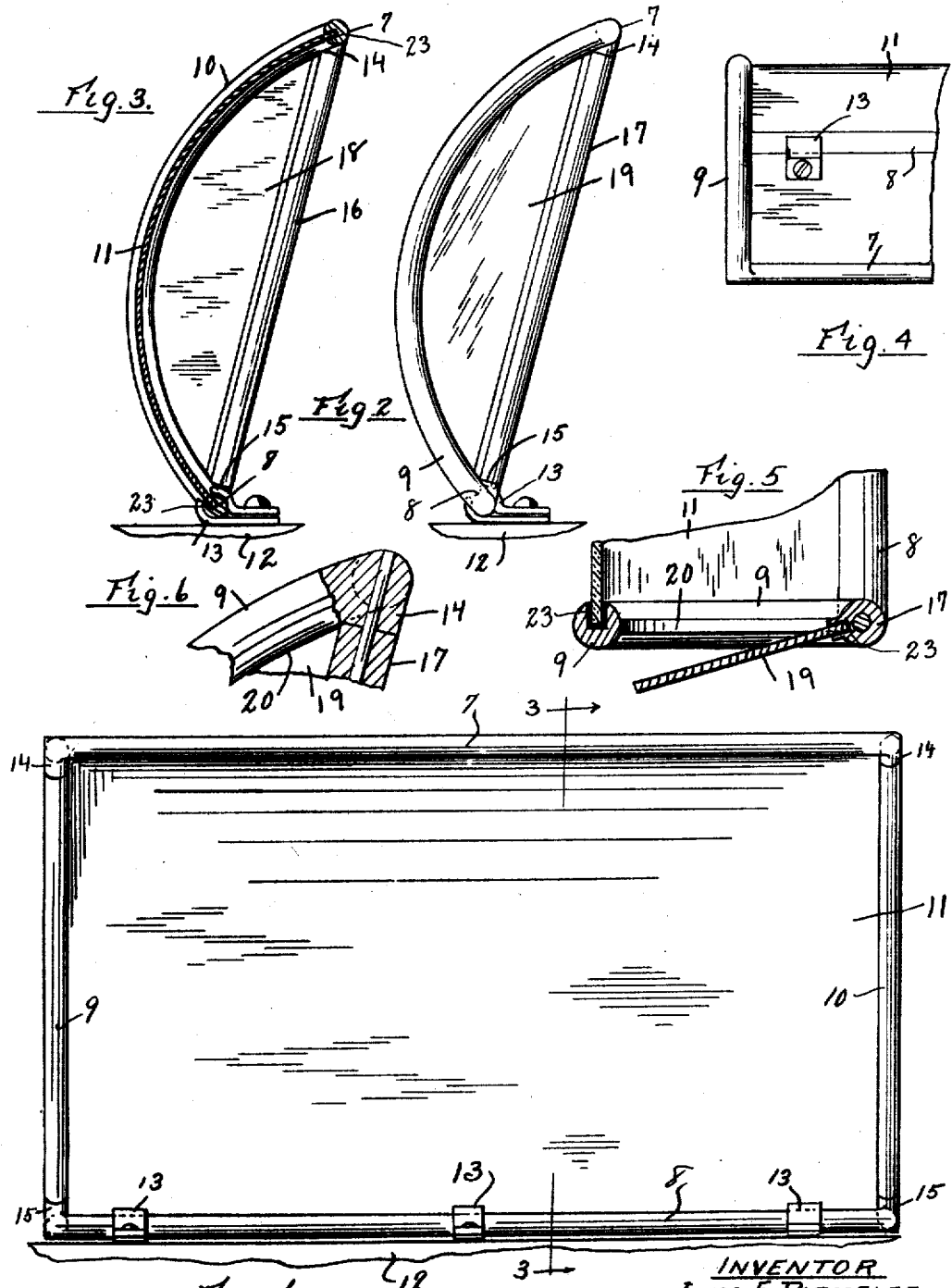

JAMES E. PARMELEE, OF LOS ANGELES, CALIFORNIA, ASSIGNOR TO LILLIAN M. PARMELEE, OF LOS ANGELES, CALIFORNIA.

WINDSHIELD.

1,366,483.  Specification of Letters Patent.  Patented Jan. 25, 1921.

Application filed October 30, 1917. Serial No. 199,258. Renewed October 16, 1920. Serial No. 417,403.

*To all whom it may concern:*

Be it known that I, JAMES E. PARMELEE, a citizen of the United States, residing at the city of Los Angeles, county of Los Angeles, and State of California, have invented certain new and useful Improvements in Windshields, of which the following is a specification.

My invention relates to a windshield for moving vehicles, such as automobiles, autotrucks, aeroplanes, power boats and the like and the object thereof is to provide a device of this character which will be cheap, simple in construction and operation, and which can be easily and quickly adjusted to exclude or permit varying quantities of air to pass therethrough.

Heretofore in the use of windshields as at present in use especially on automobiles, when the automobile is being driven toward the sun or when meeting an automobile coming in the opposite direction which is driving toward the sun or other bright light, or during night driving with headlights burning the light is caught by the glass of the shield and reflected into the eyes of the driver which has often resulted in his losing control of the vehicle resulting in an accident and often the serious injury of the driver besides damaging the vehicle sometimes beyond repair thereby causing serious losses and inconvenience.

It is the prime object of my invention to produce a windshield which will entirely obviate these objectionable features and which will scatter the rays of light which pass through the windshield toward the operator and distribute the same in such manner that the operator's view therethrough is at all times unobstructed regardless of the amount or intensity of the light.

Other objects and advantages will appear hereinafter, and while I have shown and will describe my preferred form of construction, it will be understood that I do not limit myself to such preferred form but that various changes and adaptations may be made therein without departing from the spirit of my invention.

I accomplish these objects by the invention described herein and illustrated in the accompanying drawings forming a part hereof in which:

Figure 1, is an elevation of my windshield as viewed from the vehicle.

Fig. 2 is an end elevation of Fig. 1.

Fig. 3 is a section on the line 3—3 of Fig. 1.

Fig. 4 is a top plan of a fragment of my shield showing the side wings opened for ventilation.

Fig. 5, is an enlarged sectional detail of a portion of my device showing the side wing construction.

Fig. 6 is an enlarged sectional detail of the hinge on the side wing.

Referring to the drawings my shield comprises a main frame composed of top and bottom rails 7 and 8 and side rails 9 and 10, in which frame is mounted the main shield 11 of glass or any other suitable material. The top and bottom rails 7 and 8 respectively are straight and substantially parallel while the side rails 9 and 10 are curved or bowed outwardly as best shown in Figs. 2 and 3, it also being noticed that top rail 7 is positioned farther toward the driver of the vehicle than the bottom rail which tips the shield rearwardly when the same is positioned for use on the vehicle. The bottom rail 8 is secured to the body of the vehicle 12 in the usual position and is secured thereto by clamps 13 in the usual manner or in any other suitable manner. The main shield 11 is curved or bowed to correspond with the top, bottom and side rails of the main frame, the result being a windshield of semi-cylindrical configuration with the straight sides of the same extending horizontally and the curved or bowed portion extending from the driver. Extending vertically from the ends of the top and bottom rails at their junction with the side rails are ears or lugs 14 and 15 which extend toward each other, and in these ears are mounted the ends of a hinge member 16 in which is mounted the side wings 18 and 19. Side wings 18 and 19 are of a configuration to snugly fit the ends of the main frame and close the same to prevent the admission of air therethrough when desired, and by means of the hinge connection 16 may be swung to direct the air into the interior of the driver's compartment when desired. A strip of rubber or other shock-absorbing material 20 is secured to the inner side of the side rails 9 and 10 and acts to provide a cushion for the curved end of said side wings when the same are closed, and acts to prevent undue breakage and also to prevent rattling when the vehicle is in motion. A chain 11b or other adjustable fastening bar is secured to the side wings and the side rails to adjust the amount of opening of the side wings. Packing strips 23 of rubber or other suitable material are provided between the glass shield 11 and top, bottom and side rails within the slots in the usual manner to prevent breakage due to the vibration of the frame when the vehicle is in motion.

By making the glass portion of the shield of a curved or bowed construction it is possible to make the same of a much less thickness thereby reducing the cost thereof and it also offers much less resistance to the wind when the vehicle is moving as the curved construction acts to divide the wind thereby reducing the amount of fuel consumed and rendering the cost of operation less expensive.

Having described my invention what I claim is:

1. A windshield comprising a semi-cylindrical transparent view member, said member being mounted at one of its longitudinal edges upon the body of a vehicle, transversely thereof, with the bowed portion extending away from the driver; a frame for said view member in which the same is mounted; a hinge member revolubly mounted at its ends in the top and bottom members of said frame at the ends thereof; and a side wing mounted in each of said hinge members, the free ends of said wings being of a configuration to fit within the bowed portion of said frame to close the ends thereof; and a narrow strip of shock absorbing material mounted upon the periphery of each of said side wings.

2. A windshield for vehicles comprising a substantially rectangular frame, the horizontal members of said frame being parallel, and the side members being curved forwardly centrally of their length, said frame being secured at its lower end to the vehicle; a transparent shield mounted in said frame; side wings hingedly connected at their ends to the upper and lower horizontal members of said rectangular frame, said side wings having their free ends semi-circular in shape to close the ends of the shield.

3. A windshield comprising a transparent view member semi-cylindrical in shape, said shield being mounted at one of its longitudinal edges upon the body of a vehicle transversely thereof with the bowed portion extending away from the driver; a frame for said view member in which the same is mounted; a hinge member revolubly mounted at its ends in the top and bottom members of said frame at each end thereof; and a side wing mounted in each of said hinge members, the free end of said wings being of a configuration to fit within the bowed portion of said frame to close the ends thereof.

In witness that I claim the foregoing I have hereunto subscribed my name this 22nd day of October 1917.

JAMES E. PARMELEE.